US008560239B2

(12) United States Patent
Clark et al.

(10) Patent No.: US 8,560,239 B2
(45) Date of Patent: Oct. 15, 2013

(54) SYSTEM AND METHOD FOR MULTIPLE DELETE ENTRY ON CONTROL DISPLAY UNIT

(75) Inventors: Samuel T. Clark, Federal Way, WA (US); Robert P. Smith, Clinton, WA (US); Roglenda R. Bowe, Maple Valley, WA (US); Andrew D. Neff, Kent, WA (US)

(73) Assignee: The Boeing Company, Chicago, IL (US)

( * ) Notice: Subject to any disclaimer, the term of this patent is extended or adjusted under 35 U.S.C. 154(b) by 1426 days.

(21) Appl. No.: 12/015,391

(22) Filed: Jan. 16, 2008

(65) Prior Publication Data

US 2009/0157303 A1 Jun. 18, 2009

Related U.S. Application Data

(63) Continuation-in-part of application No. 11/954,387, filed on Dec. 12, 2007, now Pat. No. 8,428,872.

(51) Int. Cl.
*G01C 21/36* (2006.01)

(52) U.S. Cl.
USPC ........... 701/538; 701/411; 701/418; 701/467; 701/541

(58) Field of Classification Search
USPC ............... 701/3, 8, 9, 26, 207, 411, 418, 467, 701/538, 541; 715/764, 700; 707/800, 805; 345/168, 169, 172, 173
See application file for complete search history.

(56) References Cited

U.S. PATENT DOCUMENTS 3,706,969 A 12/1972 Paredes
4,604,711 A 8/1986 Benn et al.
5,086,513 A * 2/1992 Lawrence et al. .......... 455/186.1
5,475,594 A 12/1995 Oder et al.
5,587,724 A * 12/1996 Matsuda ...................... 345/156

(Continued)

FOREIGN PATENT DOCUMENTS

WO WO 03/071228 8/2003
WO WO 03/071228 A2 8/2003
WO WO 2006/085749 8/2006
WO WO2006/085749 A1 8/2006

OTHER PUBLICATIONS

International Search Report for Application No. GB 0822030.3 dated Mar. 13, 2009.

(Continued)

*Primary Examiner* — James Trammell
*Assistant Examiner* — Jerrah Edwards
(74) *Attorney, Agent, or Firm* — Klintworth & Rozenblat IP LLC

(57) ABSTRACT

A method is provided for modifying navigation information on a control display unit which has at least one entry field and a plurality of display lines. The method includes at least receiving a plurality of delete command entries, receiving a display line selection, determining the number of delete command entries, identifying a navigation route segment displayed in the selected display line, wherein the navigation route segment displayed in the selected display line comprises at least a first navigation route segment, deleting the first navigation route segment, deleting navigation route segments which follow the first navigation route segment in sequential order until the number of deleted navigation route segments equals the number of delete command entries received, and displaying the navigation information. A system which executes the method is also provided.

20 Claims, 13 Drawing Sheets

(56) References Cited

U.S. PATENT DOCUMENTS

| | | | | |
|---|---|---|---|---|
| 5,715,163 | A * | 2/1998 | Bang et al. | 701/202 |
| 6,112,141 | A * | 8/2000 | Briffe et al. | 701/14 |
| 6,389,355 | B1 | 5/2002 | Gibbs et al. | |
| 6,731,226 | B2 | 5/2004 | Walter | |
| 6,751,545 | B2 | 6/2004 | Walter | |
| 6,789,010 | B2 | 9/2004 | Walter | |
| 7,222,017 | B2 | 5/2007 | Clark et al. | |
| 2003/0105579 | A1 | 6/2003 | Walter | |
| 2003/0182052 | A1 * | 9/2003 | DeLorme et al. | 701/201 |
| 2004/0006412 | A1 | 1/2004 | Doose et al. | |
| 2004/0054550 | A1 | 3/2004 | Cole et al. | |
| 2005/0090969 | A1 | 4/2005 | Siok et al. | |
| 2006/0066590 | A1 * | 3/2006 | Ozawa et al. | 345/173 |
| 2007/0299597 | A1 | 12/2007 | Fetzmann et al. | |
| 2008/0189646 | A1 * | 8/2008 | Bohle | 715/781 |

OTHER PUBLICATIONS

International Search Report for Application No. GB0822030.3 dated Mar. 13, 2009, 3 pages.

* cited by examiner

SYSTEM AND METHOD FOR MULTIPLE DELETE ENTRY ON CONTROL DISPLAY UNIT

CONTINUATION-IN-PART

This application is a Continuation-In-Part of co-pending patent application entitled SYSTEM AND METHOD FOR ENTRY OF TAXI ROUTE ON CONTROL DISPLAY UNIT, U.S. patent application Ser. No. 11/954,387, filed Dec. 12, 2007.

FIELD OF THE INVENTION

The present invention relates generally to computer-based-systems used in the navigation of aircraft.

BACKGROUND OF THE INVENTION

The Flight Deck Control Display Unit ("CDU") is an interface system that allows a pilot to monitor and control various other aircraft systems. The CDU is the primary interface for the aircraft's Flight Management System ("FMS"), thereby making the CDU the primary system used to enter and display the navigation route for flight. However, the CDU is generally not used to enter and display the ground navigation route for taxiing of aircraft because the surface traffic movement does not lend itself to predefined or 'stored' taxi routes, taxi route datalink capability does not currently exist, and the manual entry and display of taxi route navigation using the current CDU interface would require many user inputs, which is inefficient. Conventional solutions to this problem have been to develop systems that are completely separate from the CDU. Separate systems are problematic for several reasons, including because they require the pilot to learn how to use such systems, take up valuable space and add complexity in an already crowded and complex flight deck, and federate aircraft navigation interface and display into separate locations and methods. It is desirable to provide a common system and method of aircraft navigation interface and display that utilizes the CDU to integrate taxi and flight routes, is efficient, and minimizes error potential.

In addition, modification of navigation route using the current CDU interface can be inefficient. Manual modification of navigation route that requires deletion of multiple individual navigation route segments requires many user inputs, which is inefficient. It is desirable to provide a system and method that reduces the number of user inputs required to delete multiple individual navigation route segments.

SUMMARY

A method is provided for modifying navigation information on a control display unit which has at least one entry field and a plurality of display lines. The method includes at least receiving a plurality of delete command entries, receiving a display line selection, determining the number of delete command entries, identifying a navigation route segment displayed in the selected display line, wherein the navigation route segment displayed in the selected display line comprises at least a first navigation route segment, deleting the first navigation route segment, deleting navigation route segments which follow the first navigation route segment in sequential order until the number of deleted navigation route segments equals the number of delete command entries received, and displaying the navigation information.

A system is also provided for modifying navigation information displayed on a control display unit. The system has at least a control display unit adapted to display navigation information and receive user inputs comprising at least one entry field and a plurality of display lines, wherein the user can input in the entry field at least a plurality of delete commands and the user can select a display line in which a first navigation route segment is to be deleted. The processor is in communication with the control display unit and the processor is adapted to determine the number of delete command entries, delete the first navigation route segment, and delete navigation route segments which follow the first navigation route segment in sequential order until the number of deleted navigation route segments equals the number of delete command entries. The processor is also adapted to display the navigation information on the control display unit.

The features, functions, and advantages that have been discussed can be achieved independently in various embodiments of the present invention or may be combined in yet other embodiments further details of which can be seen with reference to the following description and drawings.

DETAILED DESCRIPTION

A system and method for receiving and displaying a taxi route on a Flight Deck Control Display Unit ("CDU") of commercial aircraft is provided. The system allows the pilot to center and display a taxi route on the CDU in an efficient way. This reduces the potential for pilot error and the need for separate systems in the flight deck that are dedicated to the display of taxi route information, which thereby reduces the training required for pilots who must use such separate systems. In addition, because the CDU is the main interface with the Flight Management System ("FMS") of the aircraft, it is beneficial to have taxi route and flight route navigation information that is entered, displayed, and controlled on the CDU.

In addition, a system and method for modification of navigation route using the CDU is also provided. The system and method allows for the efficient manual modification of navigation route which requires deletion of multiple individual navigation route segments. This reduces the potential for pilot error and reduces the number of user inputs required to delete multiple individual navigation route segments.

Figure 1:
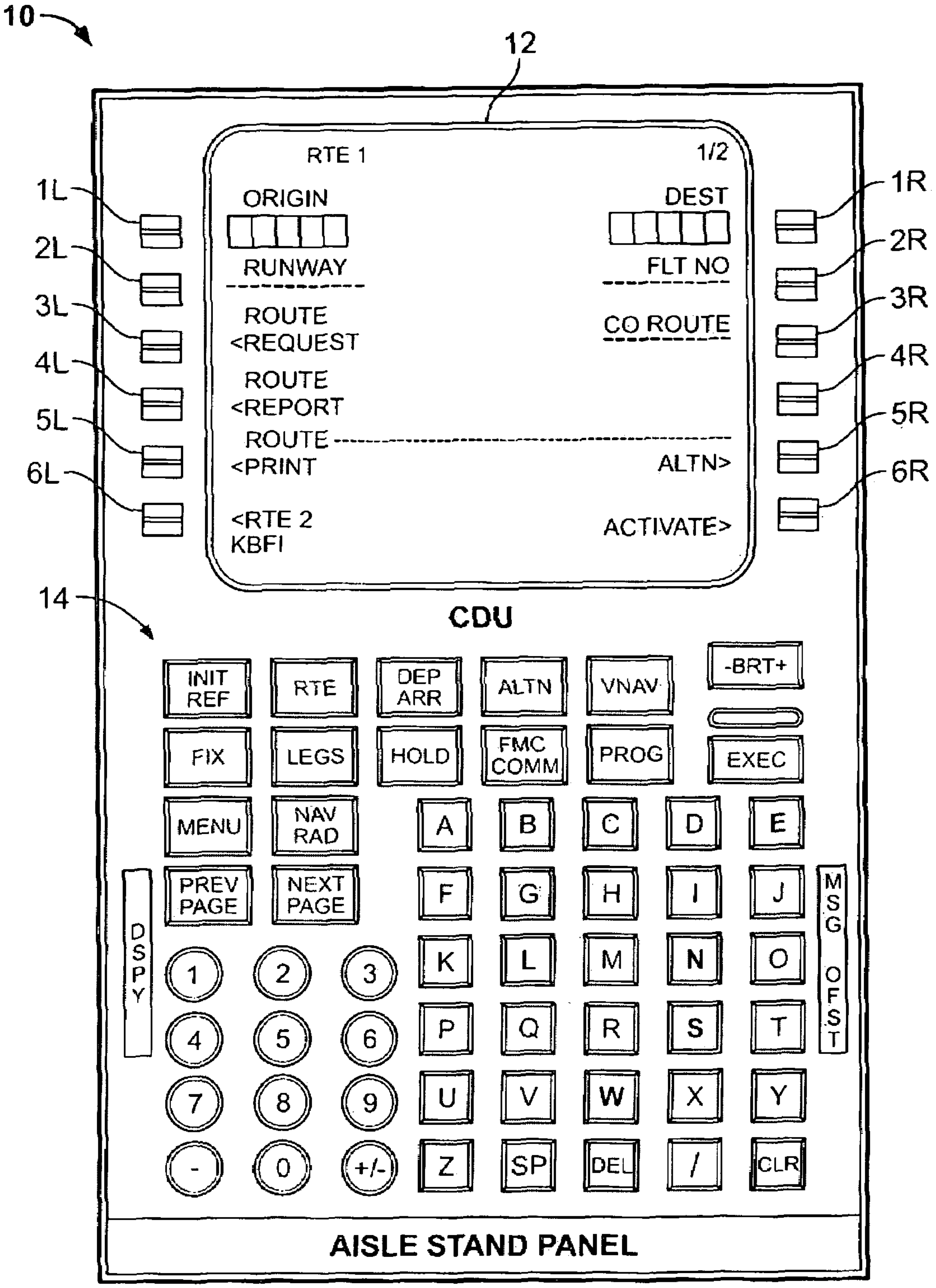
FIG. 1 is a drawing of a conventional CDU for a commercial aircraft.
Figure 2:
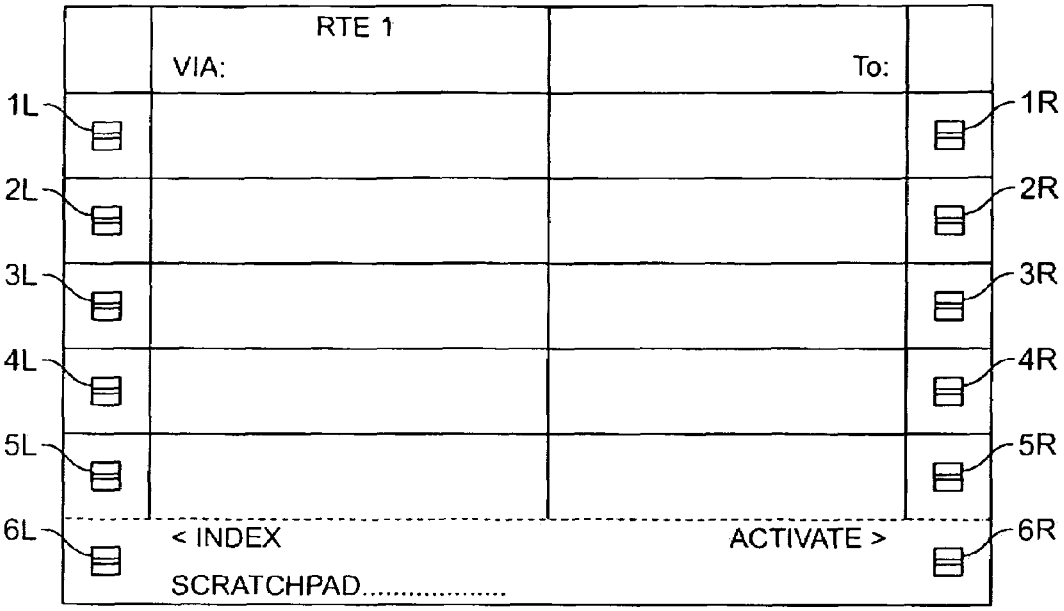
FIG. 2 is a drawing of a CDU display screen with an entry field, a plurality of display lines, and corresponding display line select keys.

Referring to FIG. 1, a drawing of a conventional CDU 10 for commercial aircraft is shown. The CDU has a display 12 and a keypad 14. Keypad 14 includes CDU page keys, alphanumeric entry keys, and various CDU display function keys. Display 12 can have at least one entry field, a plurality of display lines, and a plurality of display line select keys corresponding to display lines. The conventional CDU includes twelve display lines and display line select keys, six on the left and six on the right, and are commonly referred to as 1L through 6L for the display lines and display line select keys on the left side of the CDU display screen and 1R through 6R for the display lines and display line select keys on the right side of the CDU display screen. The entry field for conventional CDU is below display line 6L and is commonly referred to as the SCRATCHPAD. A drawing of display 12 with cleared display lines and entry field, labeled SCRATCHPAD, is shown in FIG. 2. To aid the description of the drawings showing examples of display 12, the display lines corresponding to their respective display line select keys 1L through 6L and 1R through 6R are delineated in table form. For example, referring to FIG. 2, the box to the right of display line select key 1L will be referred to as display line 1L and the box to the left of display line select key 1R will be referred to as display line 1R.

Figure 3A:
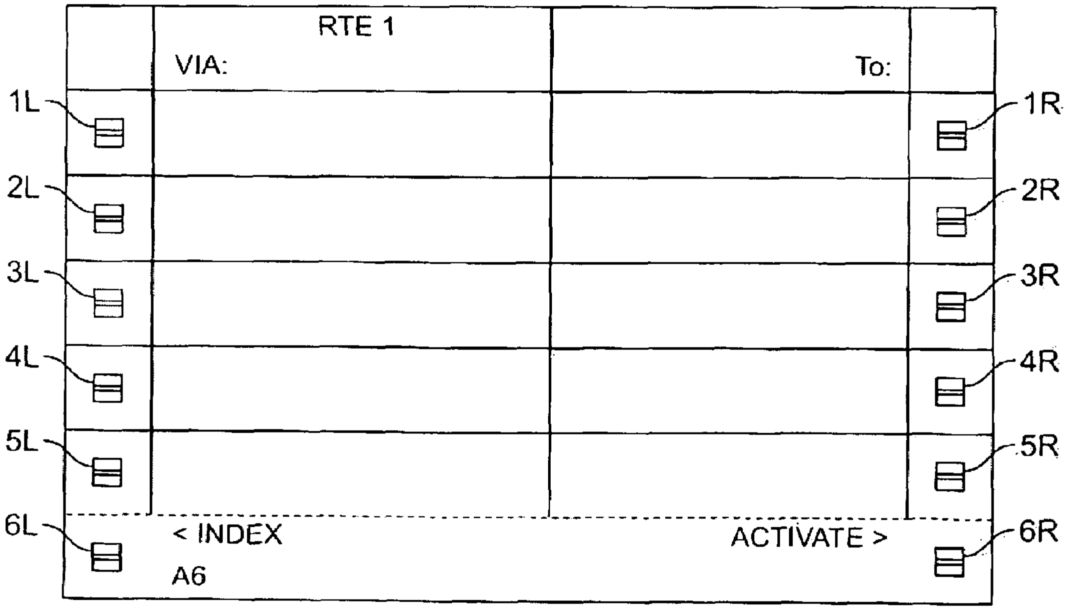
FIGS. 3A through 3D are a series of drawings of CDU display screens that show taxi route entry and display on a CDU according to a conventional method.
Figure 3B:
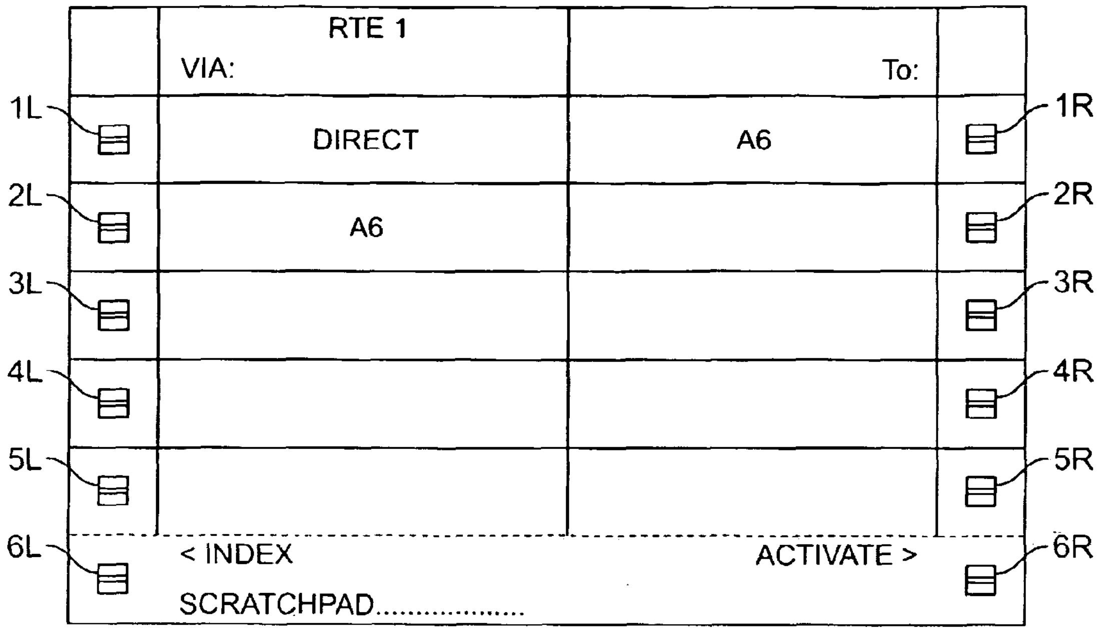
Figure 3C:
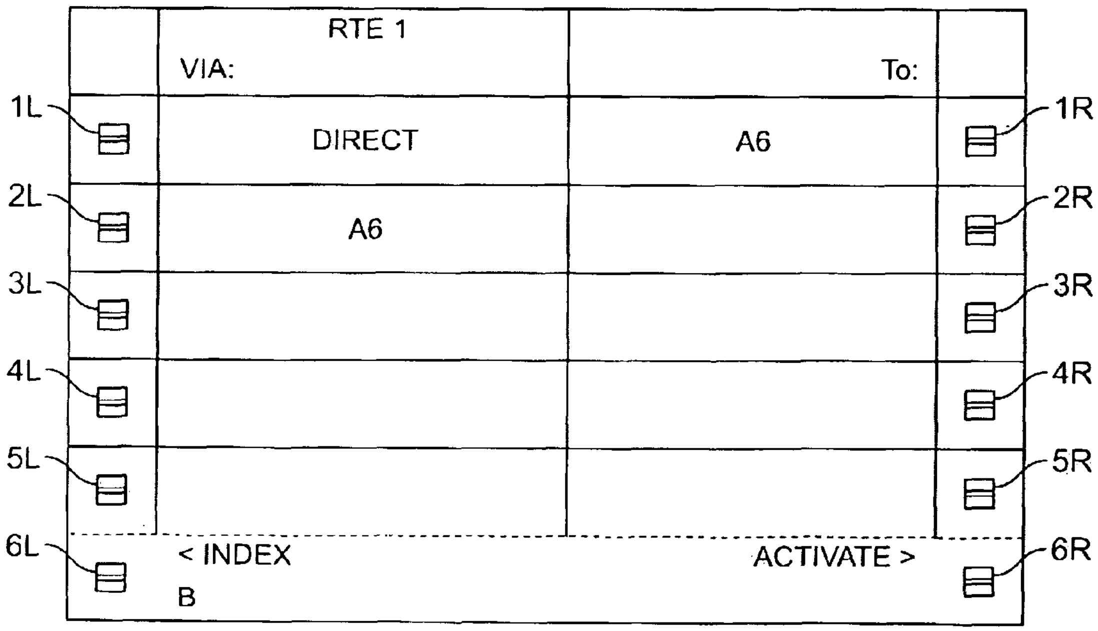
Figure 3D:
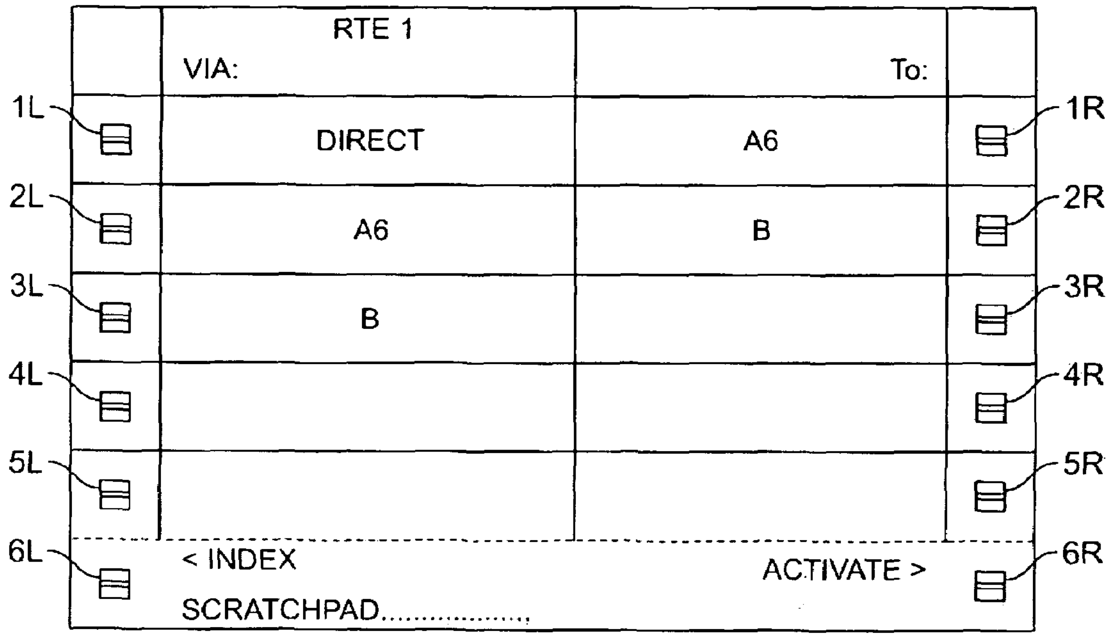

The conventional method of entering and displaying route and other information on the CDU requires multiple inputs by the pilot. Referring to FIG. 3A, the pilot must first, enter a first taxi route segment into the SCRATCHPAD entry field using the keypad, which in this example is taxi route segment A6, and second, press one of the display line select keys in which the first taxi route segment is to be displayed. For example, referring to FIG. 3B, if the pilot pressed display line select key 1R, the system would display taxi route segment A6 in display line 1R. In addition, the system would display DIRECT in display line 1L and taxi route segment A6 in display line 2L to show that the aircraft must move from its current position, which is represented by the term DIRECT, to taxi route segment A6 in order to reach segment A6 in the taxi route. Alternatively, the pilot could have selected line select key 1L, and A6 would have displayed in line 1L. To continue to enter the taxi route, the pilot must enter a second taxi route segment into the SCRATCHPAD entry field using the keypad and press the display line select key in which the second taxi route segment is to be displayed. For example, referring to FIG. 3C, if the assigned taxi route is to have taxi route segment B follow taxi route segment A6, the pilot would enter B into the SCRATCHPAD entry field using the keypad. Then, referring to FIG. 3D, the pilot would press display line select key 3L to display taxi route segment B in display line 3L. In addition, the system would display taxi route segment B in display line 2R to show that the aircraft must move via taxi route segment A6 to taxi route segment B to move along the taxi route. For the conventional method and system, this order of entries must be repeated to enter a series of taxi route segments to display a taxiway navigation route on the CDU.

Figure 4:
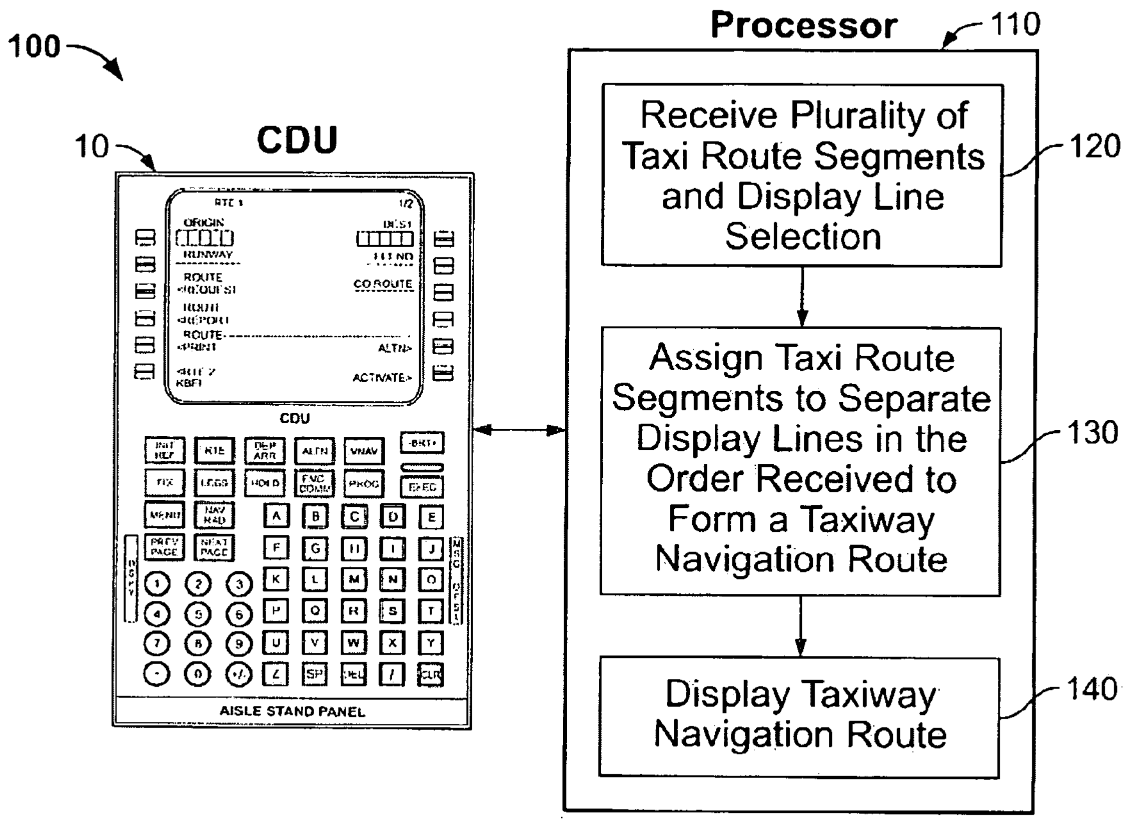
FIG. 4 is a flow diagram illustrating operation of one example of a system and method for receiving and displaying a taxi route on a CDU.

The method and system disclosed herein, on the other hand, allows the pilot to enter a plurality of taxi route segments into the SCRATCHPAD entry field and display a taxiway navigation route with a single display line selection, thereby using a significantly less number of inputs. Referring to FIG. 4, an example illustration of the operation of system 100 is provided. System 100 running on processor 110 in this example is in the form of a software program used to display a taxiway navigation route on a conventional CDU 10. In step 120, a plurality of taxi route segment entries and a display line selection are received from CDU 10. The plurality of taxi route segments can be input into the entry field by several methods of entry, including but not limited to manual keypad entry, manual touch screen entry, verbal entry, datalink entry, and stored and recall entry. In addition, a delimiter may be manually or automatically input after each taxi route segment to signal that a discrete taxi route segment has been entered. The delimiters can be a space entry, a period, a dash, or other symbols, characters, or numbers. The system can also be adapted to recognize taxi route segments and automatically insert delimiters upon entry of the discrete taxi route segment. In step 130, the taxi route segments are assigned to separate display lines in the order in which the taxi route segments were received to form a taxiway navigation route. In step 140, the taxiway navigation route is displayed on CDU 10. One example of the operation of the system and method is described below in further detail with reference to FIGS. 5A and 5B.

Figure 5A:
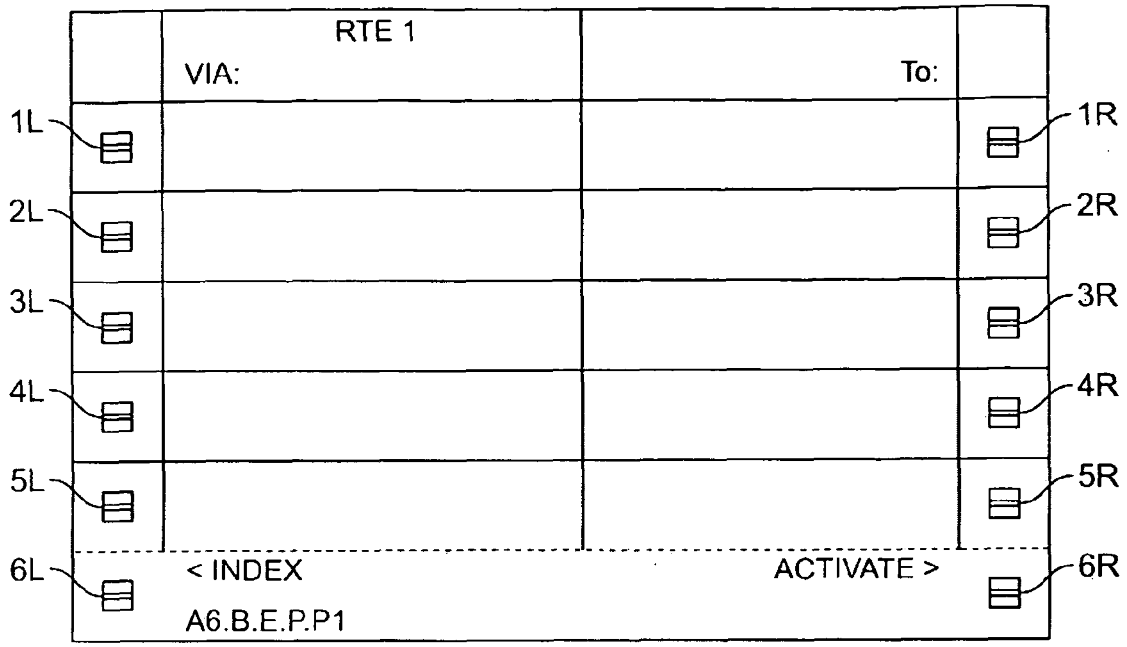
FIGS. 5A and 5B are a pair of drawings of CDU display screens that show how a taxi route is entered and displayed according to one example of the method disclosed herein.
Figure 5B:
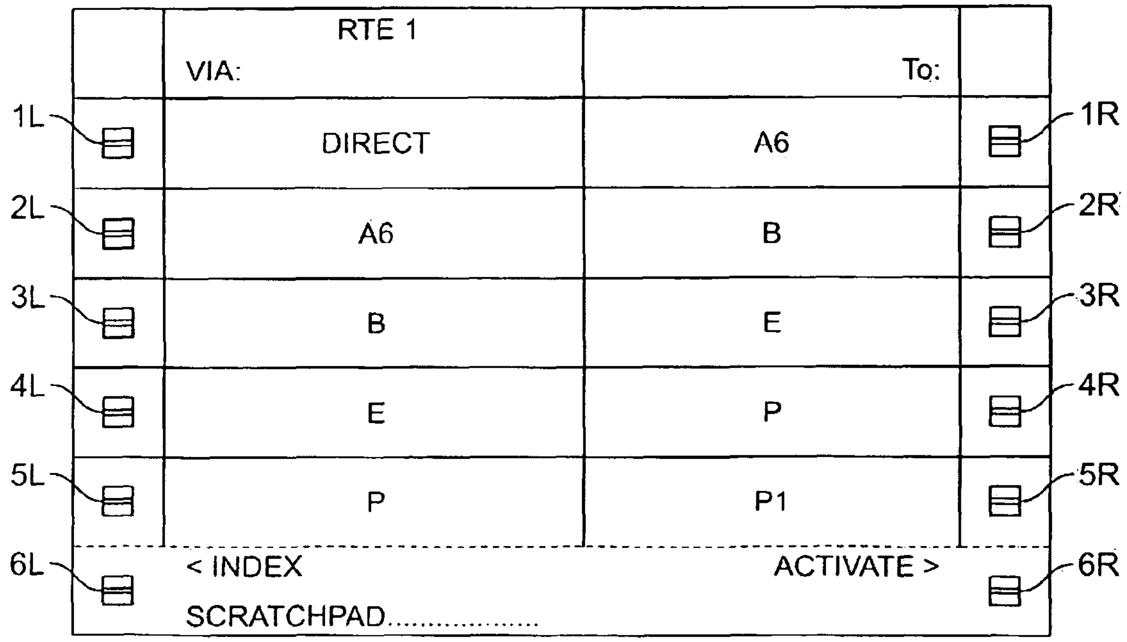

Referring to FIG. 5A, the pilot could: first, using the keypad, enter a first taxi route segment, which in this example is taxi route segment A6, followed by a second taxi route segment, B; a third taxi route segment, E, a fourth taxi route segment, P, and a fifth taxi route segment, P1. As each segment is keyed, it is displayed in the SCRATCHPAD entry field. Then, second, the pilot presses one of the display line select keys to select which display line the first taxi route segment is to be displayed. The system would then automatically assign the taxi route segments to separate display lines in the order in which the taxi route segments were entered. FIG. 5B shows where, if line select key 1R were selected, the system would assign and display the plurality of taxi route segments entered in FIG. 5A to separate display lines in the order the taxi route segments were entered.

Therefore, a pilot can enter a plurality of taxi route segments into the SCRATCHPAD entry field and assign and display the taxiway navigation route in nearly half of the inputs required with the conventional method. For example, to enter and display a taxiway navigation route of five taxi route segments using the conventional method, the pilot would have to make at least eleven inputs. Using the method disclosed herein, however, entering the same taxiway navigation route of five taxi route segments would only require seven inputs. In addition, the number of times the pilot must reach from the keyboard to a line select key and locate a specific line select key is reduced from five to only once. The reduction in number of inputs and number reaches from the keyboard to a line select key is significant. Pilot workload, time, and opportunity for error are all reduced. The net result is an increase in interface efficiency and accuracy.

Figure 6A:
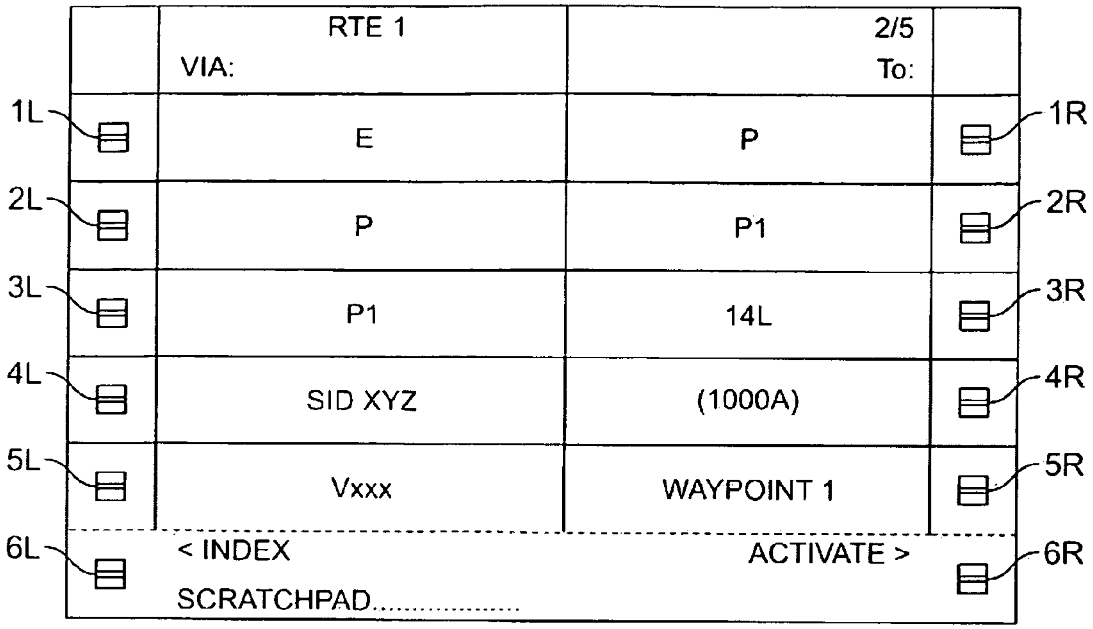
FIGS. 6A and 6B are drawings of CDU display screens that show a taxi-out route and a taxi-in route appended to a flight navigation route.
Figure 6B:
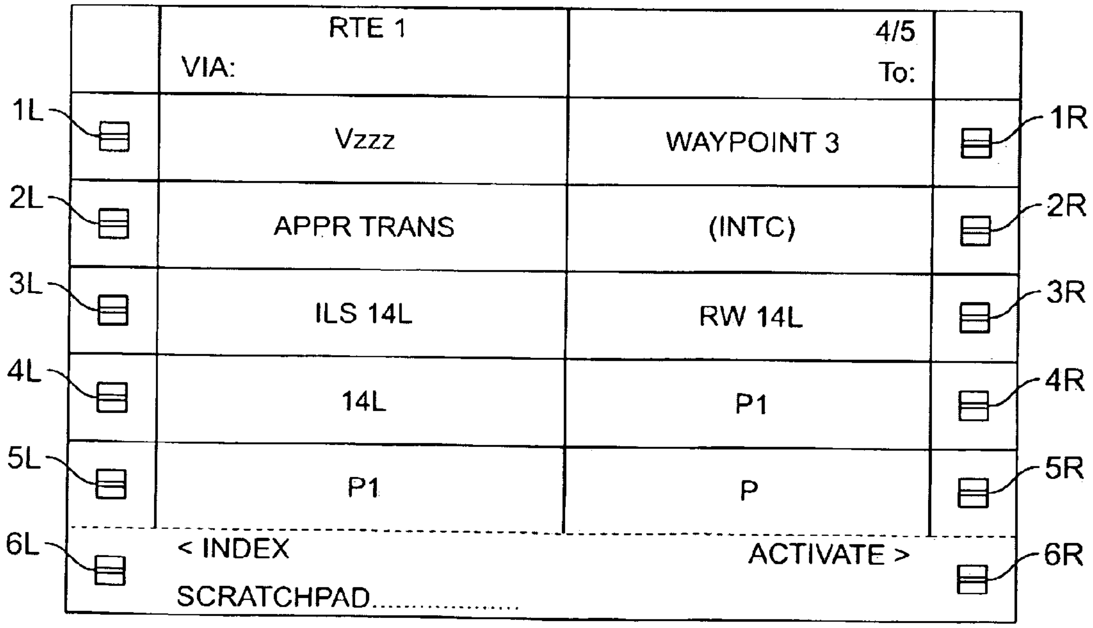

In addition, referring to FIGS. 6A and 6B, the taxiway navigation route can be appended to the flight navigation route. FIG. 6A shows one example of a taxi-out navigation route where taxi route segments E, P, and P1 lead to runway 14L. The flight navigation route begins after runway 14L with Standard Instrument Departure XYZ (SID) and airway segment Vxxx to WAYPOINT1. FIG. 6B shows one example of a taxi-in navigation route where the flight navigation route is via airway Vzzz to WAYPOINT3 and the approach, via APPR TRANS to intercept ILS 14L, and via ILS 14L to runway 14L.

The taxi-in navigation route begins after the flight navigation route ends with runway 14L leading to taxi route segments P1 and P. A missed approach route (not shown) may or may not be displayed. If a missed approach is displayed, the taxi route would be appended after the missed approach, and automatically appended to the landing runway when the missed approach is automatically cleared or deleted after landing. If the missed approach is executed and flown, the taxi route may or may not be cleared.

Figure 7:
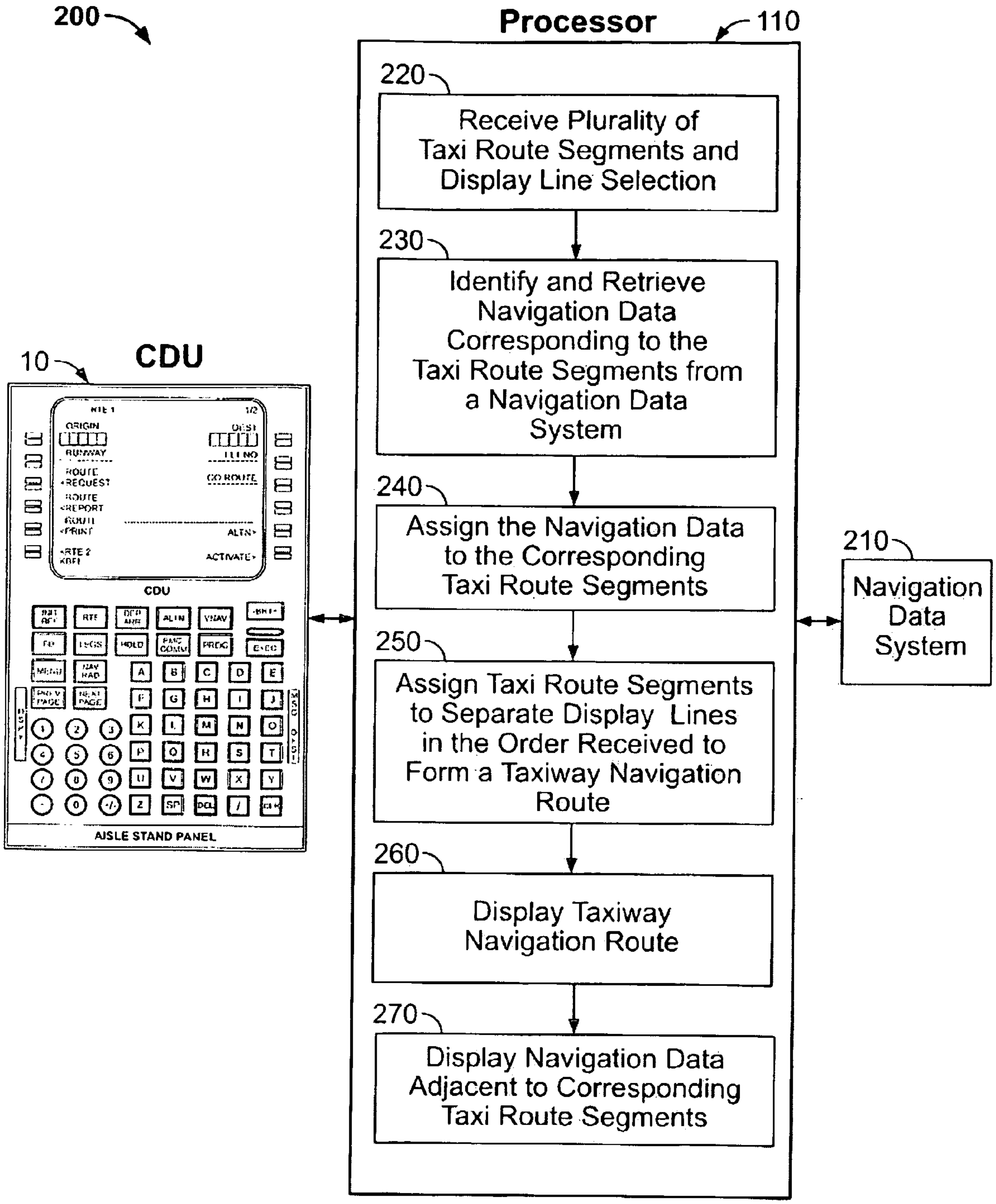
FIG. 7 is a flow diagram illustrating operation of one example of a system and method for receiving and displaying a taxi route on a CDU.
Figure 8:
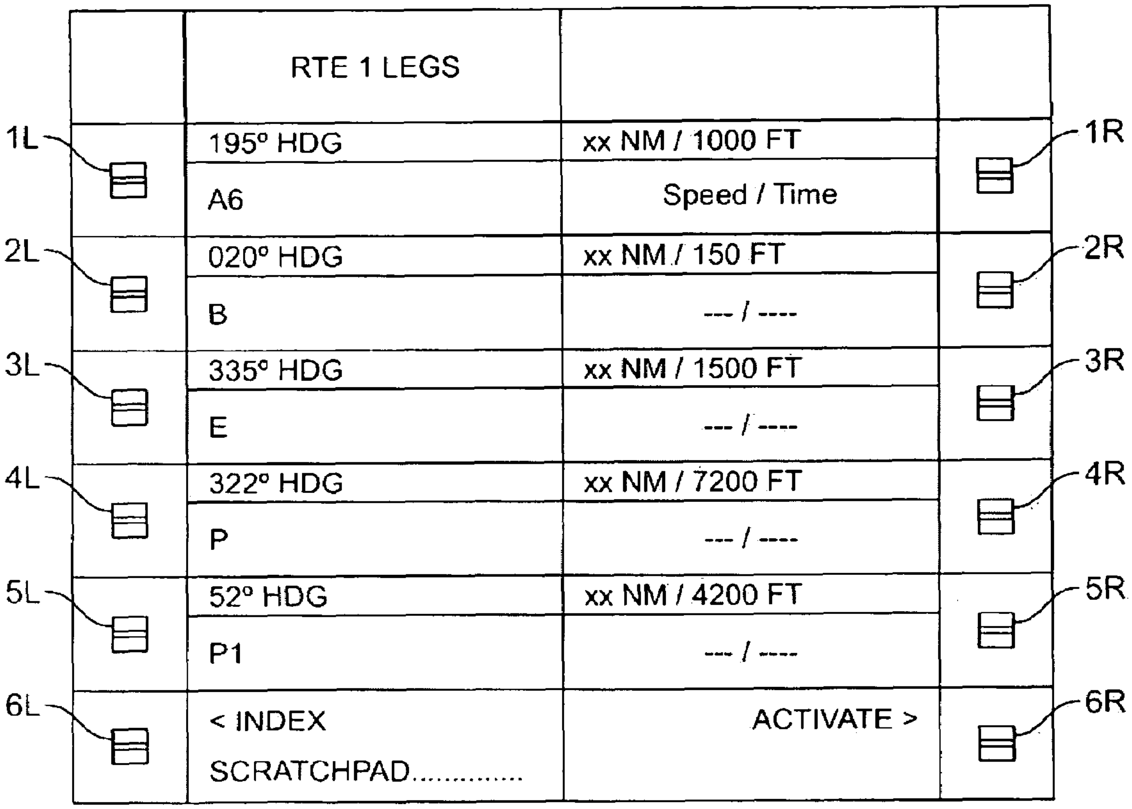
FIG. 8 is a drawing of a CDU display screen that shows a taxi route with navigation data displayed adjacent to corresponding taxi route segments.

In another example, the system can display navigation data corresponding to the taxi route segments. Referring to FIG. 7, an example illustration of the operation of system 200 running on processor 110 is provided. System 200 running on processor 110 in this example is in the form of a software program used to display a taxiway navigation route with navigation data on a conventional CDU 10. Processor 110 is in communication with CDU 10 and Navigation Data System 210. Navigation Data System 210 can be one or several systems that measure, calculate, receive, or store navigation related data. For example, Navigation Data System 210 can be an Airport Moving Map application (AMM), a Global Positioning System (GPS), the aircraft's own avionic devices, and all or more of these and related devices and databases. In step 220, a plurality of taxi route segment entries and a display line selection are received from CDU 10. In step 230, navigation data corresponding to the taxi route segments is identified and retrieved from Navigation Data System 210. Navigation data can include, for example, the geographic location of points on a taxi route segment, a taxi route-segment heading, a length of the taxi route segment, a distance to an end of the taxi route segment, a time remaining until an end of the taxi route segment is reached, and a speed limit or other limitations. Navigation data can also include a navigation instruction which can, for example, instruct the pilot on what action to take on or at the end of a taxi route segment (e.g., stop, hold, cross, turn left, turn right, etc.). In step 240, the navigation data is assigned to the corresponding individual taxi route segments. For example, navigation data corresponding to a first taxi route segment is assigned to the first taxi route segment and navigation data corresponding to a second taxi route segment is assigned to the second taxi route segment. In step 250, the taxi route segments are assigned to separate display lines in the order in which the taxi route segments were received to form a taxiway navigation route. In step 260, the taxiway navigation route is displayed on CDU 10. In step 270, the navigation data is displayed adjacent to its corresponding taxi route segment. For example, navigation data corresponding to the first taxi route segment is displayed adjacent to the first taxi route segment and the navigation data corresponding to the second taxi route segment is displayed adjacent to the second taxi route segment and so on. Display of navigation data adjacent to a taxi route segment can include, for example, displaying navigation data in or above the same display field as the taxi route segments or in the display field to the right of the taxi route segment. For example, referring to FIG. 8, one way the system can display a taxiway navigation route with corresponding navigation data is to display the taxi route segments along the left display lines with navigation data corresponding to the taxi route segments displayed in, above, or below the respective display lines and in the display lines to the right of the taxi route segment. In the example in FIG. 8, a taxi route segment heading corresponding to taxi route segment A6 is displayed in the same display line, display line 1L, as taxi route segment A6. In addition, a length of taxi route segment A6, aircraft speed, and time until an end of the taxi route segment is reached can be displayed to the right in display line 1R.

Figure 9A:
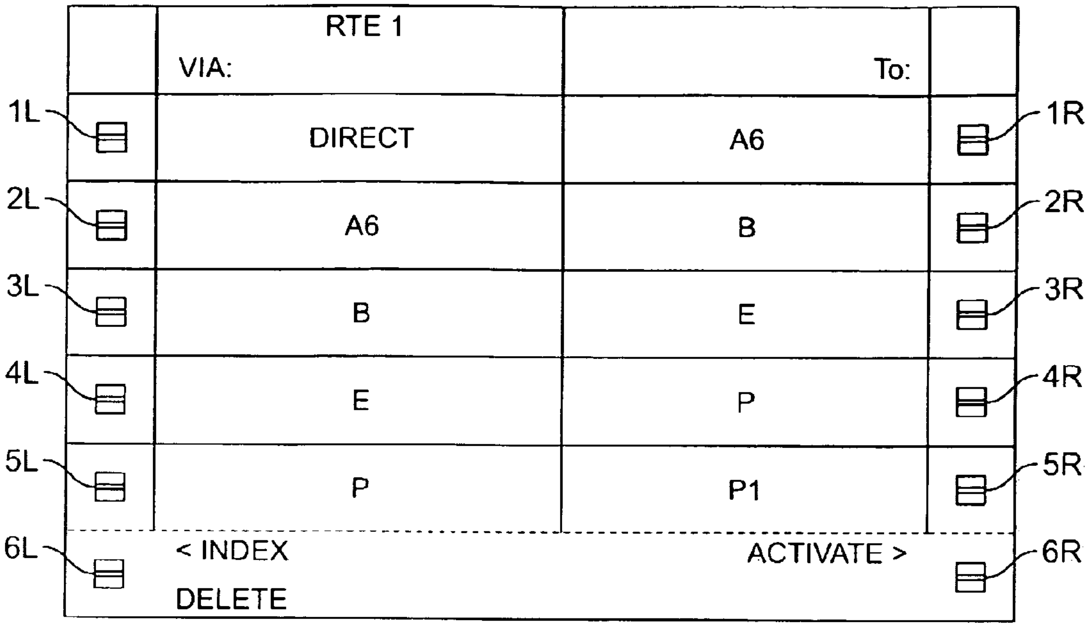
FIGS. 9A through 9D are drawings of CDU display screens that show a navigation route modified on a CDU according to a conventional method.
Figure 9B:
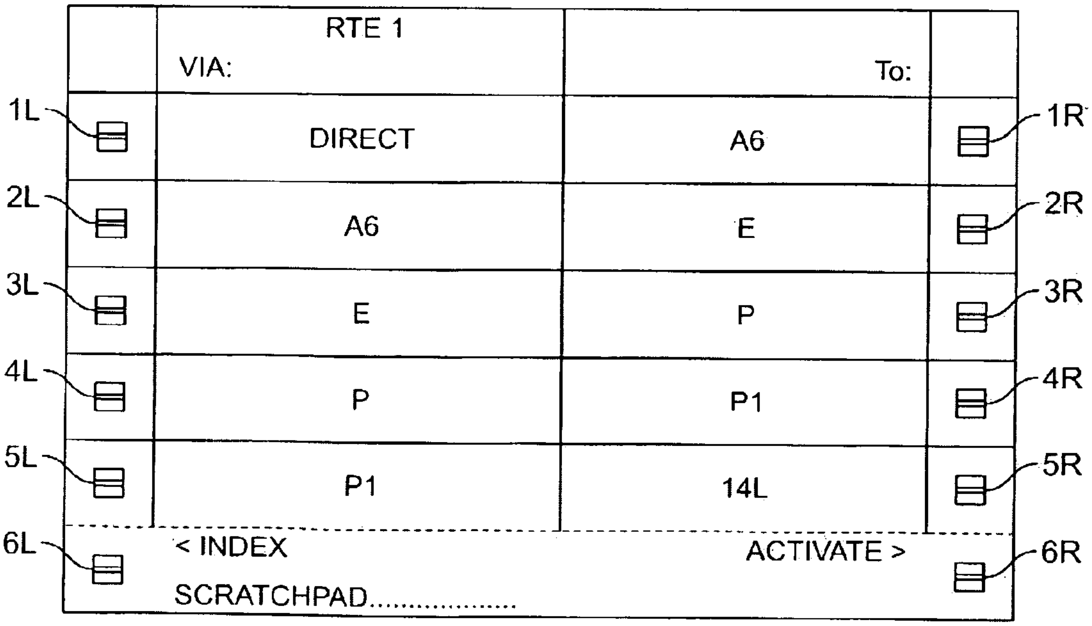
Figure 9C:
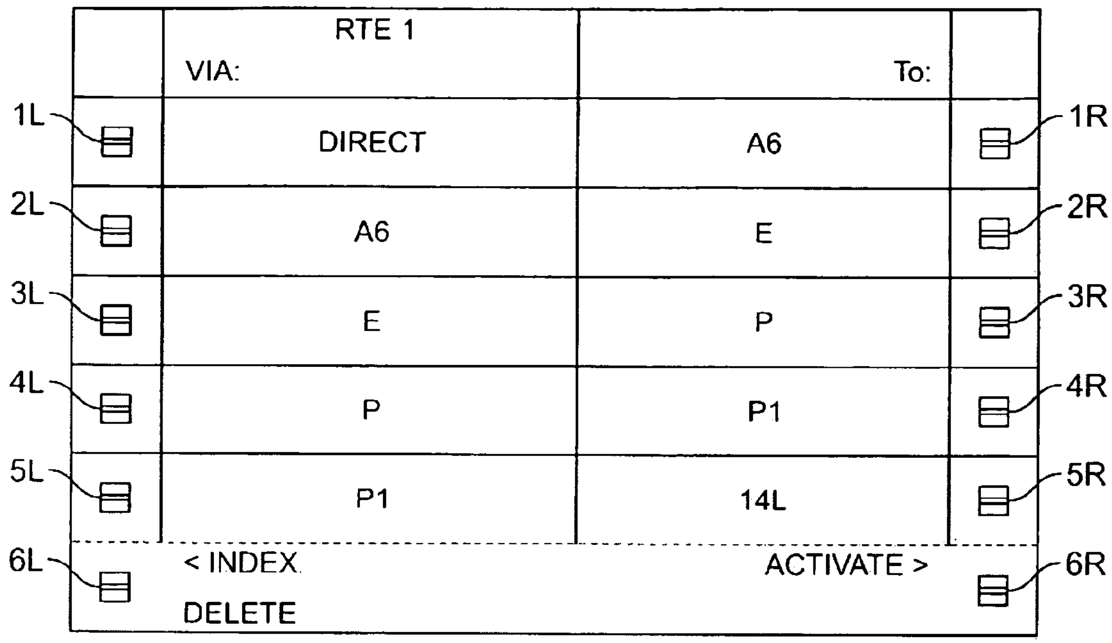
Figure 9D:
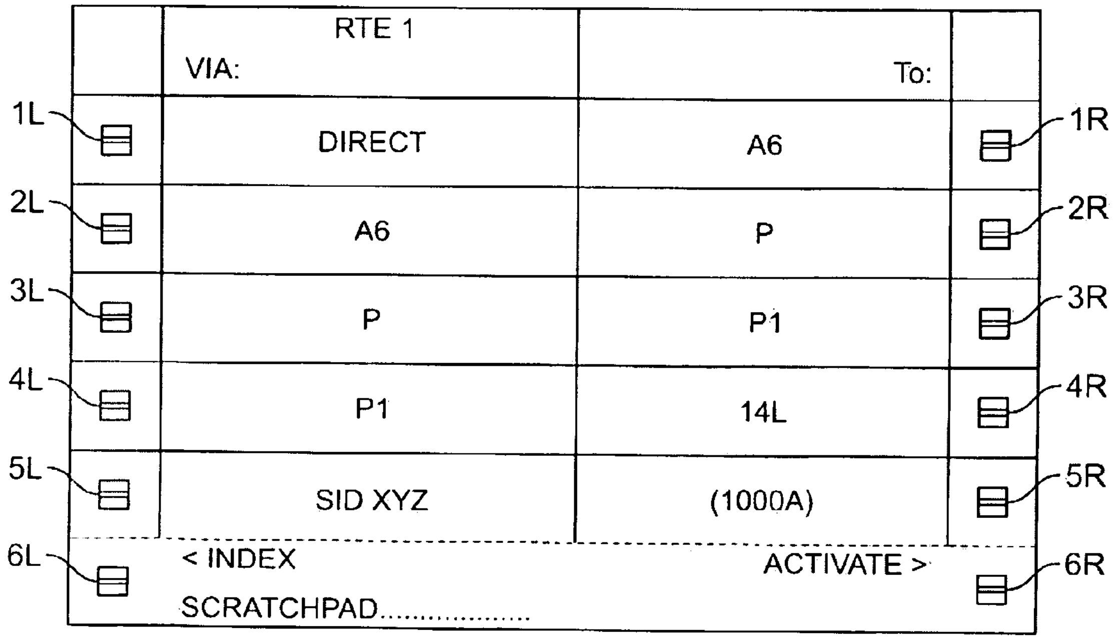

The conventional method for modifying navigation information by deleting multiple navigation route segments on the CDU requires multiple inputs by the user. The term navigation route segment as used herein includes information used by the pilot to navigate, monitor, and control the aircraft and aircraft systems, including but not limited to flight route segments, taxi route segments, navigation procedures, navigation points, aircraft data, and aircraft functions. For example, referring to FIG. 9A, to delete a taxi route segments B and E in the taxiway navigation route displayed therein, the pilot must first enter a delete command in the entry field by pressing the delete key on the CDU. As shown in FIG. 9A, a delete command entry will then display in the SCRATCHPAD. Second, the pilot must press display line select key 3L to delete the taxi route segment B. The modified taxiway navigation route is shown in FIG. 9B. Third, the pilot must enter another delete command in the entry field by pressing the delete key. As shown in FIG. 9C, a delete command entry will again display in the SCRATCHPAD. Forth, the pilot must then again press display line select key 3L to delete the taxi route segment E, resulting in the modified taxiway navigation route show in FIG. 9D. This process of pressing the delete key and then pressing the display line select key corresponding to the navigation route segment must be repeated for each and every navigation route segment that the pilot wants to delete.

Figure 10:
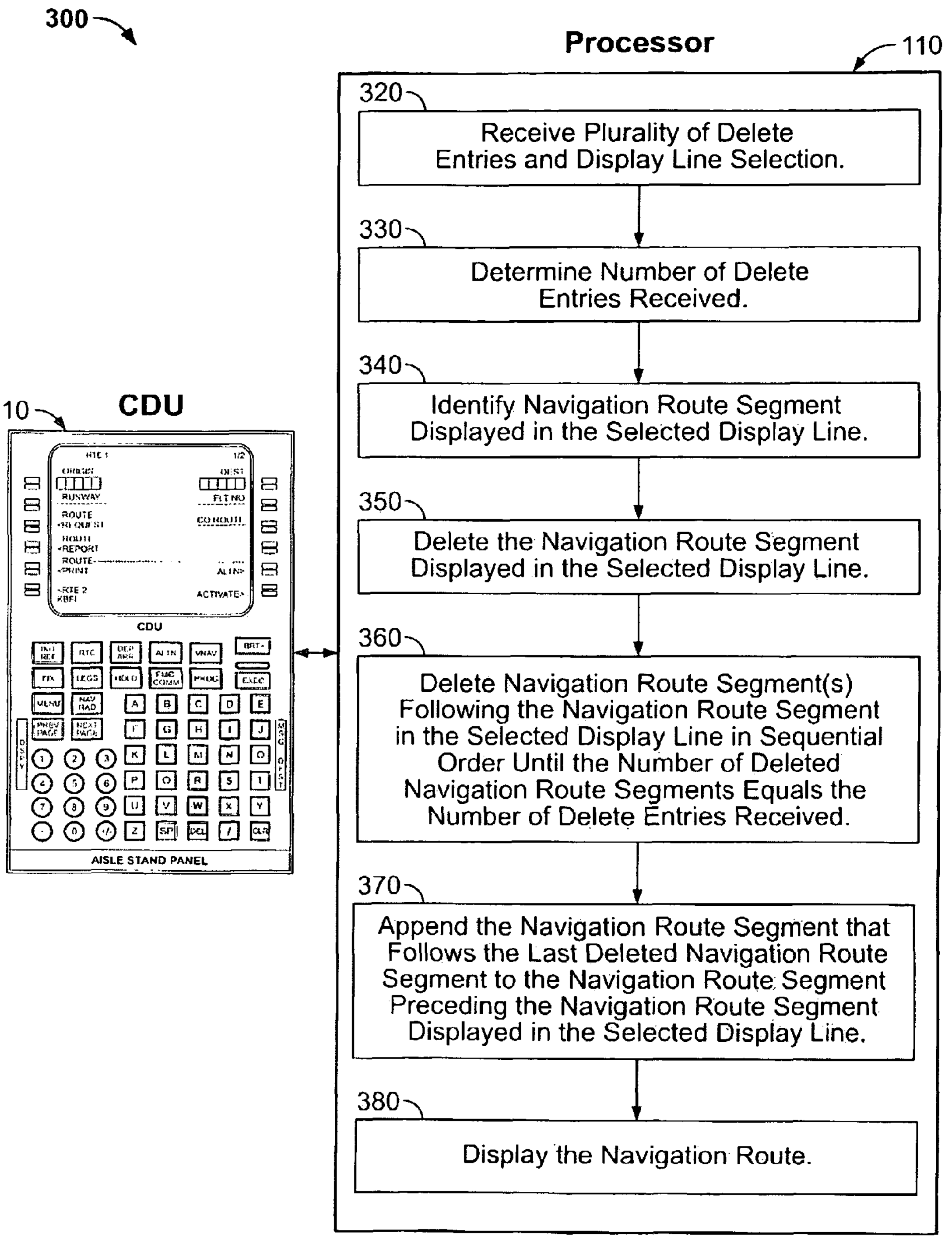
FIG. 10 is a flow diagram illustrating operation of one example of a system and method for modifying a navigation route on a CDU.

The method and system disclosed herein, on the other hand, allows the pilot to enter a plurality of delete commands into the entry field and delete a plurality of sequential navigation route segments with a single display line selection, thereby significantly reducing the number of required inputs. A reduction in the number of inputs also reduces the number of times the pilot's hand passes back and forth over the keypad and the display line select keys, thereby reducing input time and the opportunity for pilot error. Referring to FIG. 10, an example illustration of the operation of system 300 is provided. System 300 running on processor 110 in this example is in the form of a software program used to display a navigation route on a conventional CDU 10. In step 320, a plurality of delete command entries and a display line selection are received from CDU 10. The plurality of delete commands can be input into the entry field by several methods of entry, including but not limited to a manual keypad entry, manual touch screen entry, verbal entry, datalink entry, and stored and recall entry. In addition, one or more delimiters can be automatically input after each delete command entry to signal that a discrete delete command has been entered. The delimiters can be a space entry, a period, a dash, or other symbols, characters, or numbers. In step 330, the number of delete command entries received is determined. In step 340, the navigation route segment displayed in the display line selected by the pilot is identified. In step 350, the navigation route segment displayed in the selected display line is deleted. The navigation route segment displayed in the selected display line can be referred to as the first navigation route segment. In step 360, navigation route segments which follow the first navigation route segment are deleted in sequential order until the number of deleted navigation route segments equals the number of delete command entries. Therefore, if three delete commands were entered by the pilot and received by the processor, only three sequential navigation route segments would be deleted, starting with the navigation route segment in the display line selected by the pilot. An example is illustrated in greater detail below with reference to FIGS. 11A and 11B. Still referring to FIG. 10, if the deleted navigation route segments were in, for example, the middle of a navigation route, step 370 appends the navigation route segment that follows the last deleted navigation route segment to the navigation route segment preceding the navigation route segment displayed in the selected display line. Continuity in the navigation route may or may not result. Where a route discontinuity results, additional inputs would be required to provide continuity. In step 380, the modified navigation route is displayed. In addition, navigation data corresponding to deleted navigation route segments can be deleted along with the deleted navigation route segments.

Figure 11A:
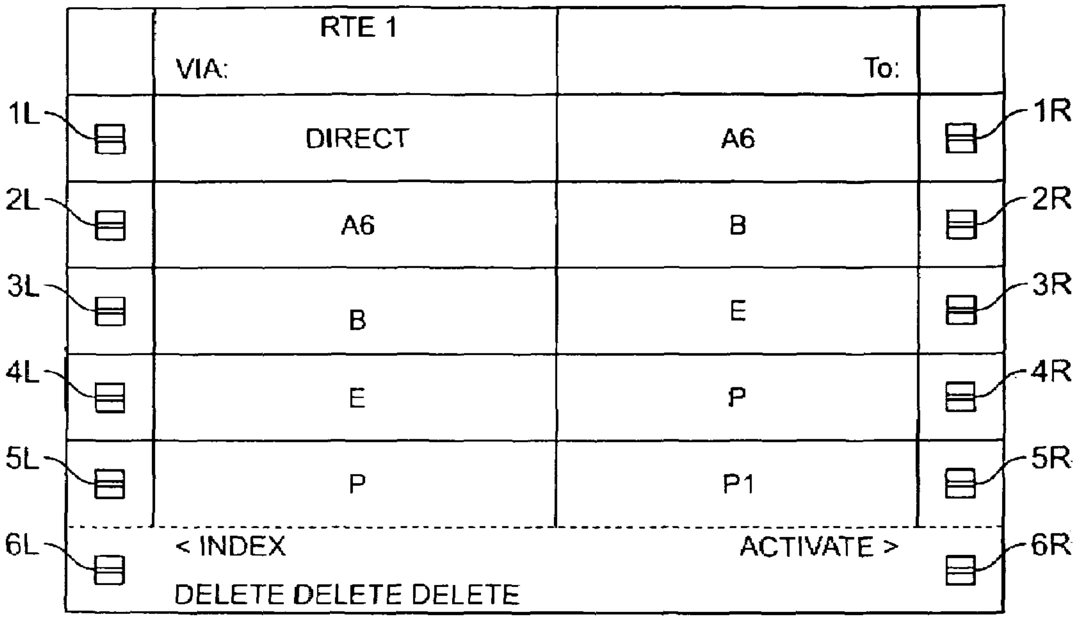
FIGS. 11A and 11B are drawings of CDU display screens that show one example of a modification to a navigation route.
Figure 11B:
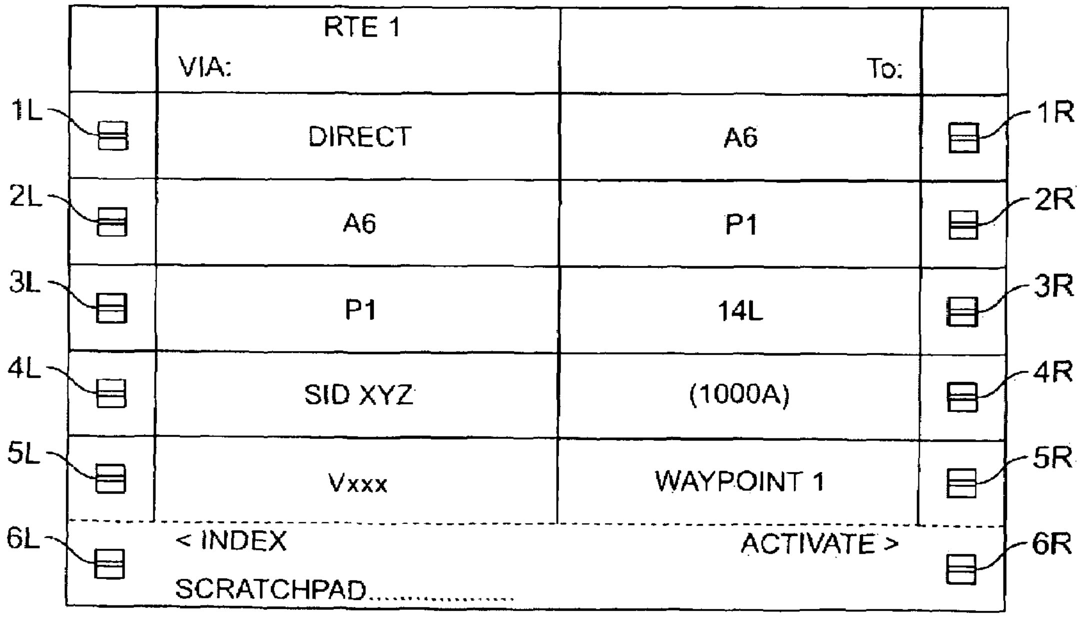

Referring to FIGS. 11A and 11B, one example of the system and method in operation is described. If a pilot chose to delete taxi route segments B, E, and P in the taxiway navigation route shown in FIG. 11A, the pilot would enter multiple delete commands in the entry field by pressing the delete key on the CDU three times. As shown in FIG. 11A, three delete command entries will then display in the SCRATCHPAD. Second, the pilot would press display line select key 3L to designate taxi route segment B as the first navigation route segment for deletion. The system would then determine that the number of delete command entries is three and identify that the navigation route segment displayed in the selected display line as taxi route segment B. Then, the system would delete taxi route segment B and delete navigation route segments which follow taxi route segment B in sequential order until the number of deleted navigation route segments equal the number of delete command entries. In this case, because taxi route segments E and P are the two navigation route segments that follow taxi route segment B in sequential order they are deleted, resulting in a total of three deleted navigation route segments. In this example, taxi route segment B is the first navigation route segment, taxi route segment A6 is the navigation route segment preceding the first navigation route segment, taxi route segment P is the last deleted navigation route segment, and taxi route segment P1 is the navigation route segment that follows the last deleted navigation route segment. Referring to FIG. 11B, in the example, the system appends the navigation route segment that follows the last deleted navigation route segment, taxi route segment P1, to the navigation route segment preceding the first navigation route segment, taxi route segment A6.

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of modifying navigation information on a control display unit comprising at least one entry field and a plurality of display lines, the method comprising:

receiving a plurality of delete command entries and then receiving a display line selection;

determining the number of delete command entries;

identifying a navigation route segment displayed in the selected display line, wherein the navigation route segment displayed in the selected display line comprises at least a first navigation route segment;

deleting the first navigation route segment;

deleting navigation route segments which follow the first navigation route segment in sequential order until the number of deleted navigation route segments equals the number of delete command entries received; and displaying the navigation information.

2. The method of claim 1 wherein the navigation route segment comprises at least one of a flight route segment, a taxi route segment, a navigation procedure, a navigation point, aircraft data, or aircraft functions.

3. The method of claim 1 further comprising appending a navigation route segment that follows a last deleted navigation route segment to a navigation route segment preceding the first navigation route segment.

4. The method of claim 1 further comprising:

identifying navigation data corresponding to deleted navigation route segments; and deleting the navigation data corresponding to the deleted navigation route segments, wherein the navigation data corresponding to the first navigation route segment is deleted and the navigation data corresponding to the deleted navigation route segments following the first navigation route segment is also deleted.

5. The method of claim 1 wherein the navigation route comprises at least one of a ground navigation route, a flight navigation route, a taxi-out navigation route, or a taxi-in navigation route.

6. The method of claim 4 wherein the navigation data comprises at least one of a geographic location of points on a taxi route segment, a taxi route segment heading, a length of the taxi route segment, a distance to an end of the taxi route segment, a time remaining until an end of the taxi route segment is reached, a speed limit, or an instruction.

7. The method of claim 1 wherein the plurality of delete command entries received from the entry field were input by at least one of manual keypad entry, touch screen entry, verbal entry, datalink entry, or stored and recall entry.

8. The method of claim 7 further comprising automatically inputting delimiters between the plurality of delete command entries.

9. The method of claim 8 wherein the entry field is a scratchpad.

10. A system for modifying navigation information displayed on a control display unit, the system comprising:

a control display unit configured to receive a plurality of delete command entries, and to then receive a display line selection in which a first navigation route segment is to be deleted;

a processor in communication with the control display unit, wherein the processor is configured to determine the number of delete command entries, delete the first navigation route segment, delete navigation route segments following the first navigation route segment in sequential order until the number of deleted navigation route segments equals the number of delete command entries, and display the navigation information on the control display unit.

11. The system of claim 10 wherein the navigation route segment comprises at least one of a flight route segment, a taxi route segment, a navigation procedure, a navigation point, aircraft data, or aircraft functions.

12. The system of claim 10 wherein the processor is adapted to append a navigation route segment that follows a last deleted navigation route segment to a navigation route segment preceding the first navigation route segment.

13. The system of claim 10 wherein the processor is adapted to identify navigation data corresponding to deleted navigation route segments and to delete the navigation data corresponding to the deleted navigation route segments.

14. The system of claim 10 wherein the navigation route comprises at least one of a ground navigation route, a flight navigation route, a taxi-out navigation route, or a taxi-in navigation route.

15. The system of claim 13 wherein the navigation data comprises at least one of a geographic location of points on a taxi route segment, a taxi route segment heading, a length of the taxi route segment, a distance to an end of the taxi route segment, a time remaining until an end of the taxi route segment is reached, a speed limit, or an instruction.

16. The system of claim 10 wherein the processor is adapted to receive the plurality of delete command entries and display line selection by at least one of manual keypad entry, touch screen entry, verbal entry, datalink entry, or stored and recall entry.

17. The system of claim 16 wherein the processor is adapted to automatically insert delimiters between the plurality of delete command entries.

18. The system of claim 17 wherein the entry field is a scratchpad.

19. The method of claim 1 wherein the receiving the plurality of delete command entries and then receiving the display line selection further comprises receiving and displaying the plurality of delete command entries, and then receiving a display line selection.

20. The system of claim 10 wherein the control display unit is further configured to receive and display the plurality of delete command entries, and to then receive the display line selection.

* * * * *